United States Patent [19]

Sublett

[11] Patent Number: 5,106,944
[45] Date of Patent: Apr. 21, 1992

[54] PROCESS AND CATALYST-INHIBITOR SYSTEMS FOR PREPARING POLY(1,4-CYCLOHEXENEDIMETHYLENE TEREPHTHALATE)

[75] Inventor: Bobby J. Sublett, Kingsport, Tenn.

[73] Assignee: Eastman Kodak Company, Rochester, N.Y.

[21] Appl. No.: 547,747

[22] Filed: Jul. 3, 1990

[51] Int. Cl.⁵ ............... C08G 63/02; C08G 63/78
[52] U.S. Cl. .................... 528/279; 528/272; 528/274; 528/275; 528/307; 525/439
[58] Field of Search ............ 528/272, 274, 275, 279, 528/286, 307; 525/439

[56] References Cited

U.S. PATENT DOCUMENTS 3,493,542  2/1970  Feinaur ............................. 528/279
4,093,603  6/1978  Jackson, Jr. et al. ............... 528/279

Primary Examiner—Harold D. Anderson
Assistant Examiner—T. Mosley
Attorney, Agent, or Firm—John F. Stevens; William P. Heath, Jr.

[57] ABSTRACT

Disclosed is a process for preparing polyesters of dimethyl terephthalate with 1,4-cyclohexanedimethanol using a catalyst comprising a titanium alkoxide and an alkaline earth metal salt.

6 Claims, No Drawings

PROCESS AND CATALYST-INHIBITOR SYSTEMS FOR PREPARING POLY(1,4-CYCLOHEXENEDIMETHYLENE TEREPHTHALATE)

TECHNICAL FIELD

This invention relates to an improved process and catalyst-inhibitor system for preparing synthetic linear polyesters from dimethyl terephthalate and 1,4-cyclohexenedimethanol. By using a complex of titanium and alkali or alkaline earth metal salt in the catalyst-inhibitor system, fast reaction rates and reduced formation of undesirable yellow color are realized.

BACKGROUND OF THE INVENTION

Poly(1,4-cyclohexenedimethylene terephthalate) [PCT] and copolyesters thereof with up to 40 mol % ethylene glycol are important polyesters in producing articles such as packaging materials, molding materials, etc. A problem which has been encountered has been producing the polymer at a fast reaction rate without causing an undesirable yellow color in the polymer, particularly where these polyesters are coextruded with polycarbonate to form alloys.

The present invention is based on a catalyst stabilizer system containing compounds of titanium and alkali or alkaline earth metal salts which permits fast production rates with little or no undesirable color.

U.S. Pat. No. 3,907,754 discloses a catalyst-inhibitor system containing titanium, manganese, cobalt, phosphorus for poly(ethylene terephthalate) which provides a fast reaction (production) rate and polymer with good color. This patent does not disclose antimony or an alkali metal salt as part of this catalyst combination, and does not address acetaldehyde generation. U.S. Pat. No. 3,962,189 discloses manganese, titanium, cobalt, phosphorus plus an alkali metal salt which is used to produce poly(ethylene terephthalate) with fast reaction rate, good color and an alkali metal salt in low concentration (2 to 32 ppm) to prevent a batho-chromic dye shift when the polyester is spun into fiber and dyed. This patent does not include antimony in the catalyst inhibitor system, and does not address acetaldehyde generation. U.S. Pat. No. 4,010,145 discloses a manganese, titanium, cobalt, phosphorus antimony catalyst inhibitor system for producing poly(ethylene terephthalate) at a fast rate with good color. There is no alkali metal salt disclosed in this patent and does not address acetaldehyde generation. U.S. Pat. No. 4,356,299 discloses a titanium, antimony, manganese, cobalt, and phosphorus catalyst system for producing poly(ethylene terephthalate) at fast rate with good color. This patent is for a reduced titanium concentration to provide good color and fast reaction rate, and does not address acetaldehyde generation. U.S. Pat. No. 4,357,461 discloses the use of an alkali metal salt of ethylenediamine-tetraacetic acid to reduce the acetaldehyde generation rate inherent in preparation and processing of poly(ethylene terephthalate) for packaging. However, this patent does not address the use of a titanium catalyzed polyester. U.S. Pat. No. 4,361,681 discloses the use of dicarboxylic acid anhydrides to reduce acetaldehyde in the preparation and processing of poly(ethylene terephthalate) for packaging and uses, namely bottles.

DESCRIPTION OF INVENTION

This invention provides a catalyst system for polyesters and copolyesters of poly(1,4-cyclohexylenedimethylene terephthalate), which when melt blended with polycarbonate or other phenolic type polyesters does not discolor and does not form the well known yellow-to-brown phenol-titanium complex when melt blended.

The present invention provides a process for producing polyesters comprising reacting dimethyl terephthalate with 1,4-cyclohexanedimethanol and combinations of 1,4-cyclohexanedimethanol with up to about 40 mol % ethylene glycol in a reaction mix at a temperature sufficient to effect ester interchange and in the presence of a catalyst system comprising a complex of titanium alkoxide with an alkali or alkaline earth metal salt wherein the titanium is present in an amount of about 10–100 ppm titanium and wherein the metal to titanium atom ratio is at least 0.25:1, the ppm being by weight based on the acid fraction of the polyester.

The dimethyl terephthalate referred to herein may contain up to about 25 mol % dimethyl isophthalate.

The reaction is carried out using conventional reaction conditions.

The catalyst system may also contain conventional catalysts/inhibitors such as cobalt and phosphorus.

Typical processes are disclosed, for example, in U.S. Pat. No. 3,962,189.

The catalysts according to this invention may be added to the reaction mix at the beginning, i.e., prior to transesterification. In any case the titanium and alkali or alkaline earth metal salt should be added prior to polycondensation.

Examples of suitable cobalt salts are cobaltous acetate trihydrate, cobaltous nitrate, cobaltous chloride, cobalt acetylacetonate, cobalt naphthenate, and cobalt salicyl salicylate.

The preferred phosphate ester, if used has the formula

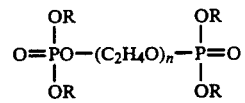

wherein n has an average value of 1.5 to about 3.0 with about 1.8 being most preferred and each R is hydrogen or an alkyl radical having from 6 to 10 carbon atoms with octyl being most preferred, the ratio of the number of R groups of hydrogen atoms to the number of phosphorus atoms being about 0.25 to 0.50 with about 0.35 being most preferred; and the ester having a free acidity equivalent of about 0.2 to 0.5, the ester being present in the amount to provide phosphorus in the amounts of 13–240 parts per million based on the acid fraction of the polyester to be produced. Other phosphate esters useful in this invention include ethyl acid phosphate, diethyl acid phosphate, triethyl acid phosphate, arylalkyl phosphates, tris-2-ethylhexyl phosphate and the like.

The phosphate ester may be used in an amount to provide phosphorus at a concentration such that the atom ratio of the amount of phosphorus to the sum of the amounts of cobalt, manganese, and titanium is between 1.0 and 2.0 i.e., $$1.0 \leq \frac{[P]}{[Co] + [Mn] + [Ti]} \leq 2.0$$

where [ ] in each case refers to the number of gram atoms of respective components. (Gram atoms of any element = weight of the element in grams ÷ the atomic weight of the element in grams).

The complex of titanium alkoxide and alkali or alkaline earth metal salt may be prepared prior to addition to the reaction mixture or may be formed in situ.

Examples of useful titanium alkoxides are acetyl, triisopropyl titanate, titanium tetraisopropoxide, titanium glycolates, titanium butoxide, hexyleneglycol titanate, tetraisooctyl titanate, and the like. Titanium tetraisopropoxide is preferred.

Examples of some suitable organic salts of alkali metals or alkaline earth metals used in this invention are sodium carbonate, sodium acetate, sodium benzoate, sodium succinate, sodium acetylacetonate, sodium methoxide, sodium ethoxide, sodium dioxide, lithium carbonate, lithium acetate, lithium benzoate, lithium succinate, lithium acetylacetonate, lithium methoxide, lithium ethoxide, lithium glycoxide, potassium carbonate, potassium acetate, potassium benzoate, potassium succinate, potassium acetylacetonate, potassium methoxide, potassium ethoxide, potassium glycoxide, calcium acetate, calcium benzoate, calcium succinate, calcium acetylacetonate, calcium methoxide, calcium ethoxide, calcium glycoxide, magnesium acetate, magnesium benzoate, magnesium succinate, magnesium acetylacetonate, magnesium methoxide, magnesium ethoxide and magnesium glycoxide. Preferred salts include sodium, lithium and potassium carbonate. Polyesters of poly(1,4-cyclohexylene dimethylene terephthalate) form compatible blends with polycarbonate. When the titanium catalyzed polyester is melt blended or molded with polycarbonate, an undesirable yellow to brown color is formed. When the catalyst is the titanium/metal complex, no undesirable color is formed. The preferred concentration of titanium in these copolyesters is 100±25 ppm Ti with a alkali metal to titanium ratio of 0.25/1 or greater and a phosphorus to Ti atom-to-atom ratio of 0.5/1 to 3/1. In copolyesters of poly(1,4-cyclohexylene dimethylene terephthalate) in which part of the glycol is ethylene glycol, the preferred titanium concentration is about 50 ppm. To prevent discoloration of these copolyesters when melt blended with polycarbonate, an alkali metal-to-titanium ratio of 1/1 is preferred.

Inherent viscosity is measured at 25° C. using 0.5 g polymer per 100 mL of a solvent consisting of 60% by weight phenol and 40% by weight tetrachloroethane. The basic method is set forth in ASTM D-2857-70.

The method used for calculating catalyst metal concentrations in poly(ethylene terephthalate) for purposes of this specification may be illustrated as follows. The poly(ethylene terephthalate) is prepared in 0.60 gram mole batches. The polymer's repeat unit empirical formula is $C_{10}H_8O_4$, and its gram molecular weight thus is 192.16 g. A 0.60 mole batch yields, therefore, 115.30 g. A 0.60 mole batch of polymer requires 0.60 mole of terephthalic acid or its alkyl esters, such as dimethyl terephthalate (DMT; molecular weight = 194.19). Thus, 0.60 mole of this "acid fraction" of DMT is determined to be:

0.60 *mole* × 194.19 *g/mole* = 116.51 *g*

Catalyst metals levels are reported in parts by weight of metal in million parts by weight of DMT. Thus, 48, ppm Ti is determined as:

$$0.60 \text{ mole} \times \frac{194.19 \text{ g/mole}}{1,000,000} \times 48 = 0.00559267 \text{ g Ti}$$

The weight of other catalyst metals or other additives is calculated similarly.

The following examples are submitted for a better understanding of the invention.

A 500 mL round bottom flash equipped with a ground glass head, a stirrer shaft, nitrogen inlet, and a side arm is charged with the reactants shown in the table. The flask is immersed in a Belmont metal bath and heated with stirring of 200° C. for 20 minutes and the bath temperature is immediately increased to 295° C. over a 30 minute period of time. After this time the theoretical amount of methanol is collected. The nitrogen gas is turned off and the pressure reduced to 0.1 to 0.5 mm of Hg or less over a period of about 10 minutes. The polycondensation reaction is carried out at 295° C. for 45 minutes. The bath is lowered from the flask, the vacuum outlet clamped off, the nitrogen inlet opened and the flask allowed to come to atmospheric pressure under a nitrogen blanket. The polymer is allowed to cool to room temperature and is removed from the flask. The polymer has an inherent viscosity of 0.82. This polymer is ground to pass a 20 mesh screen. A sample of polycarbonate (Markrolon 2600) is ground blended with the polyester, dried in vacuum oven to remove moisture. The white clear blend is then extruded and molded into tensile bars and the molded bars are bright yellow to brown in color, depending on the extrusion temperature and the molding time.

Titanium-phenol colored complex is formed from titanic catalyst of polyester and phenolic end groups of polycarbonate. When alkali metal, and other components such as cobalt and phosphorus are used, these are added with the catalyst mix or in in ethylene glycol solution after transesterification and polycondensation carried out as in the above example.

TITANIUM/METAL CATALYST PREPARATION

The titanium/metal catalyst complex can be prepared in several ways. The titanium tetraisoproxide (or other titanium alkoxides) is dissolved in ethylene glycol and the metal salt (Na, K, Li, Mg, etc.) is dissolved in ethylene glycol. The metal salt solution is then added to the titanium alkoxide solution to obtain the desired metal/titanium ratio which has been formed by experimentation to 0.25/1 or greater. The solution is stirred at room temperature. The metal/titanium complex is also prepared by adding ethylene glycol solutions of the titanium alkoxide and ethylene glycol solution of the soluble metal salt to the polyester reaction mix and stirring at room temperature. The metal/titanium complex can be prepared in the reaction mix in the presence of other adjuvant catalyst and stabilizers which are conventionally used in the preparation of polyesters.

Example 1 in Table 1 shows "Hunter" "b" color value of 100% Makrolon 2600, a commercial polycarbonate. Example 2, shows "b" value color of copolyester containing 50 ppm titanium alkoxide catalyst. Example 3, shows "b" value color of same copolyester in Example 2 except this copolyester is prepared using sodium titanium complex catalyst instead of titanium alkoxide alone. Example 4 and 5 show 50/50 blend of polyesters of Examples 2 and 3 blended 50/50 with Makrolon 2600 and polyester with titanium alkoxide catalyst (Example 2) and with sodium/titanium complex catalyst (Example 3). The polyester of Example 4, sample prepared with titanium/sodium complex, does not discolor after melt blending with polycarbonate; however, the polyester prepared using titanium without the alkali metal complex in Example 5 becomes highly colored as shown by the high positive "b" color value.

The above Examples illustrate that the formation of metal/titanium complex using lithium acetate, sodium carbonate or sodium acetate inhibits discoloration when the polymers prepared using metal/titanium complex catalyst is melt blended with polycarbonate. This is interpreted as a complex formed between the metal and titanium prevents the titanium from forming the well known titanium-phenolic complex when blended with polycarbonate which is evidenced by the lack of discoloration when copolyester prepared in this manner are melt blended with polycarbonate.

TABLE 1

| | POLYESTER/BISPHENOL A POLYCARBONATE BLENDS | | | | | | | | | | |
|---|---|---|---|---|---|---|---|---|---|---|---|
| EX- AMPLE | POLY- CARBONATE TYPE | POLYESTER COMPOSITION | POLYESTER CATALYST (PPM) | | | | ADDI- TIVE PPM | ADDI- TIVE SOURCE | BLEND TEMP.C | PC/PE RATIO WT./WT. | CDM "b" COLOR |
| | | | Mn | Ti | Co | P | | | | | |
| 1 | Makrolon 2600 | | | | | | | | — | 100/0 | 2.04 |
| 2 | | A | 55 | 50 | 40 | 90 | none | none | — | 0/100 | 1.78 |
| 3 | | A | 55 | 50 | 40 | 90 | 50 ppm Na | Na2CO3 | — | 0/100 | 0.82 |
| 4 | Makrolon 2600 | A | 55 | 50 | 40 | 90 | 50 ppm Na | Na2CO3 | 300 | 50/50 | 1.85 |
| 5 | Makrolon 2600 | A | 55 | 50 | 40 | 90 | none | none | 300 | 50/50 | 9.11 |
| 6 | Makrolon 2600 | A | 55 | 50 | 40 | 90 | none | none | 300 | 50/50 | 10.69 |
| 7 | Makrolon 2600 | B | 55 | 50 | 40 | 90 | 50 ppm Na | Na2CO3 | 300 | 50/50 | 2.89 |
| 8 | | B | — | 50 | 40 | 90 | none | none | — | 0/100 | 2.36 |
| 9 | Makrolon 2600 | B | — | 50 | 40 | 90 | 50 ppm Na | Na2CO3 | 300 | 50/50 | 2.30 |
| 10 | Makrolon 2600 | B | — | 50 | 40 | 90 | none | none | 300 | 50/50 | 33.52 |
| 11 | | B | — | 50 | 40 | 90 | 50 ppm Li | LiOAc | — | 0/100 | 3.20 |
| 12 | Makrolon 2600 | B | — | 50 | 40 | 90 | 50 ppm Li | LiOAc | 300 | 50/50 | 3.60 |
| 13 | | A | 55 | 50 | 40 | 90 | 50 ppm Na | NaOAc | — | 0/100 | 1.40 |
| 14 | Makrolon 2600 | A | 55 | 50 | 40 | 90 | 50 ppm Na | NaOAc | 300 | 50/50 | 2.90 |

Examples 6 and 7 are 50/50 blends of a polyester melt blended with polycarbonate one prepared using the sodium/titanium complex catalyst (Example 7) which does not discolor and the other prepared using titanium alkoxide catalyst (Example 6) which is highly discolored after melt blending.

Example 8 is a copolyester of dimethyl terephthalate, dimethyl isophthalate (17 mol %), and 1,4-cyclohexane dimethanol. This copolyester does not contain ethylene glycol. This copolyester is prepared with titanium alkoxide catalyst and has good color as shown by the "b" color value. Example 9 is a copolyester blended with 50/50 Makrolon 2600 and the copolyester in the blend is the same as that shown in Example 8 except it was prepared using a sodium/titanium complex and as shown by the "b" color value the melt blended sample has excellent color. Example 10 is a copolyester of Example 8, prepared with straight titanium alkoxide, and melt blended 50/50 with Makrolon 2600. This polymer blend is yellow and discolored as shown by the "b" color value.

Example 11 is the copolyester of Example 8 except it is prepared using lithium/titanium complex catalyst instead of titanium alkoxide alone. This polymer has good color as shown by the "b" color value. Example 12 is the polyester of Example 11, prepared using lithium/titanium complex catalyst, blended 50/50 with Makrolon 2600. This melt blended polymer has excellent color as shown by the "b" color value.

Example 13 is a copolyester of terephthalate, 1,4-cyclohexanedimethanol and ethylene glycol prepared with sodium/titanium complex catalyst where the sodium source for forming the complex is sodium acetate rather than sodium carbonate, the copolyester has good color as shown by the "b" value color. Example 14 is the polyester of Example 45 blend 50/50 with Makrolon 2600. This polymer blend has good color as shown by the "b" color value.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

I claim:

1. Process for producing polyesters having an acid fraction and a glycol fraction comprising reacting dimethyl terephthalate with at least one glycol selected from the group consisting of 1,4-cyclohexanedimethanol, and combinations of 1,4-cyclohexanedimethanol with up to about 40 mol % ethylene glycol at an ester interchange reaction temperature and in the presence of a catalyst system comprising a complex of titanium alkoxide with an alkali or alkaline earth metal salt wherein the titanium is present in an amount of about 10–100 ppm titanium and wherein the metal of said alkali or alkaline earth metal salt to titanium atom ratio is at least 0.25:1 the ppm being by weight based on the acid fraction of the polyester.

2. Process according to claim 1 wherein the glycol is at least 80 mol % 1,4-cyclohexanedimethanol.

3. Process of claim 1 wherein said titanium alkoxide is selected from the group consisting of acetyl triisopropyl titanate, titanium tetraisopropoxide, titanium glycolates, titanium butoxide, hexylene glycol titanate and tetraisooctyl titanate.

4. Process of claim 1 wherein said alkali or alkaline earth metal salt is selected from the group consisting of sodium carbonate, sodium acetate, sodium benzoate, sodium succinate, sodium acetylacetonate, sodium methoxide, sodium ethoxide, sodium glycoxide, lithium carbonate, lithium acetate, lithium benzoate, lithium succinate, lithium acetylacetonate, lithium methoxide, lithium ethoxide, lithium glycoxide, potassium acetate, potassium carbonate, potassium benzoate, potassium succinate, potassium acetylacetonate, potassium methoxide, potassium ethoxide, potassium glycoxide, calcium acetate, calcium benzoate, calcium succinate, calcium acetylacetonate, calcium methoxide, calcium ethoxide, calcium glycoxide, magnesium acetate, magnesium benzoate, magnesium succinate, magnesium acetylacetonate, magnesium methoxide, magnesium ethoxide, and magnesium glycoxide.

5. Process according to claim 1 wherein said complex of titanium alkoxide and alkali or alkaline earth metal salt is formed in situ with the ester interchange reactants.

6. Process according to claim 1 wherein said alkali or alkaline earth metal salt is sodium or potassium carbonate.

* * * * *